US012254846B2

(12) United States Patent
Tsuruma et al.

(10) Patent No.: US 12,254,846 B2
(45) Date of Patent: Mar. 18, 2025

(54) METHOD FOR CONTROLLING A DISPLAY DEVICE

(71) Applicant: HUAWEI TECHNOLOGIES CO., LTD., Guangdong (CN)

(72) Inventors: Takeyuki Tsuruma, Yokohama (JP); Teppei Isobe, Yokohama (JP); Masafumi Matsui, Yokohama (JP)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/214,035

(22) Filed: Jun. 26, 2023

(65) Prior Publication Data

US 2023/0335068 A1 Oct. 19, 2023

Related U.S. Application Data

(63) Continuation of application No. PCT/CN2020/139839, filed on Dec. 28, 2020.

(51) Int. Cl.
*G09G 3/36* (2006.01)
*G09G 3/20* (2006.01)
*G09G 3/34* (2006.01)

(52) U.S. Cl.
CPC ......... *G09G 3/3406* (2013.01); *G09G 3/2081* (2013.01); *G09G 2320/0626* (2013.01); *G09G 2330/021* (2013.01)

(58) Field of Classification Search
CPC ............... G09G 3/3406; G09G 3/2081; G09G 2320/0626; G09G 2330/021
USPC .......................................................... 345/102
See application file for complete search history.

(56) References Cited

U.S. PATENT DOCUMENTS

2008/0068312 A1* 3/2008 Kim ..................... G09G 3/2014 345/84
2010/0171776 A1* 7/2010 Yamagata ............ G09G 3/3406 345/691
2011/0025673 A1 2/2011 Chen et al.
2013/0002529 A1 1/2013 Onogi
2013/0147857 A1* 6/2013 Kurikko ............... G09G 3/2081 345/690
2018/0120642 A1* 5/2018 Zhang .................. G09G 3/2081
2019/0156766 A1 5/2019 Lin et al.
2019/0244572 A1 8/2019 Le et al.
(Continued)

FOREIGN PATENT DOCUMENTS

CN 102428511 A 4/2012
CN 105304027 A 2/2016
CN 107591131 A 1/2018
(Continued)

*Primary Examiner* — Jennifer T Nguyen
(74) *Attorney, Agent, or Firm* — WOMBLE BOND DICKINSON (US) LLP

(57) ABSTRACT

Provided is a method for controlling a display device that is driven by using PWM signals, the method comprising: obtaining, by a controller, a type of display contents which are displayed on the display device; and controlling, by the controller, a duty of the PWM signals for driving the display device according to the type of the display contents, wherein the duty of the PWM signals is set to a first value if the type of the display contents is a video, and the duty of the PWM signals is set to a second value larger than the first value if the type of the display contents is a static-image.

20 Claims, 16 Drawing Sheets

| CONTENTS TYPE | BRIGHTNESS SETTING | | |
|---|---|---|---|
| | LOW [0%-20%] | MIDDLE [20%-80%] | HIGH [80%-100%] |
| TYPE#1 (VIDEO) | LOW DUTY PWM | MODERATE DUTY PWM | HIGH DUTY PWM |
| TYPE#2 (STATIC-IMAGE) | LOW DUTY PWM | MODERATE DUTY PWM | DC |
| TYPE#3 (COMIC,NOVEL...) | DC | DC | DC |

(56) References Cited

U.S. PATENT DOCUMENTS

| | | | |
|---|---|---|---|
| 2020/0005699 | A1 | 1/2020 | Yi et al. |
| 2020/0143756 | A1 | 5/2020 | Chen |

FOREIGN PATENT DOCUMENTS

| | | | |
|---|---|---|---|
| JP | 2004191932 | A | 7/2004 |
| JP | 2007133073 | A | 5/2007 |
| JP | 2009122552 | A | 6/2009 |
| JP | 2009265151 | A | 11/2009 |
| WO | 2006123706 | A1 | 11/2006 |

* cited by examiner

| CONTENTS TYPE | BRIGHTNESS SETTING | | |
| --- | --- | --- | --- |
| | LOW [0%-20%] | MIDDLE [20%-80%] | HIGH [80%-100%] |
| TYPE#1 (VIDEO) | LOW DUTY PWM | MODERATE DUTY PWM | HIGH DUTY PWM |
| TYPE#2 (STATIC-IMAGE) | LOW DUTY PWM | MODERATE DUTY PWM | DC |
| TYPE#3 (COMIC,NOVEL...) | DC | DC | DC |

METHOD FOR CONTROLLING A DISPLAY DEVICE

CROSS-REFERENCE TO RELATED APPLICATIONS

This application is a continuation of International Application No. PCT/CN2020/139839, filed on Dec. 28, 2020, the disclosure of which is hereby incorporated by reference in its entirety.

TECHNICAL FIELD

The present disclosure relates to a method for controlling a display device, the display device, and an apparatus having the display device.

BACKGROUND

Recent advancement of communication and image processing technologies has enabled an user to enjoy various kinds of contents by using an electronic apparatus such as a mobile phone, a smart phone, a tablet device, a personal computer, a television receiver, or a portable multimedia player. For example, the user may watch video contents, browse static images, and read reading material such as a comic, a novel, a journal or a newspaper, by using such apparatus. In this regard, one of recent technical challenges in a field of a display device is to realize preferable display quality regardless of a type of contents played on the apparatus.

Regarding the display device, the prior art suggests an organic light emitting diode (OLED) display that may switch a driving mode between a pulse width modulation (PWM) driving mode and a pulse frequency modulation (PFM) driving mode to reduce power consumption. In the PWM driving mode, each light emitting element is driven by PWM signals each including at least one pulse in each refresh period of the OLED display, where a pulse width is configured to be smaller than a single refresh period. In addition, the prior art discloses an OLED display that may drive each light emitting element in a display area by using first PWM signals with a first frequency and drive a remaining display area by using second PWM signals with a second frequency different from the first frequency.

The PWM driving mode has advantage for the video contents because short display time in each refresh period reduces motion blur perception. On the other hand, a flicker is more perceptible when a static image is displayed on the display device driving in the PWM driving mode. The flicker may be reduced by driving in a direct current (DC) driving mode because applied signal duration is long enough to be unable a viewer to perceive the flicker. However, the DC driving mode causes the motion blur when the video contents are on display. These issues may also appear in not only the OLED display but also a liquid crystal display (LCD), a micro-LED display, a mini-LED display or the like.

For the above reasons, both the flicker and the motion blur reduction are required for implementing better display quality when the apparatus plays any content type.

SUMMARY

Embodiments provide a method for controlling a display device, the display device, and an apparatus having the display device.

The display device may be an OLED display, a LCD, a micro-LED display, a mini-LED display or the like. The apparatus may be a mobile device such as a mobile phone, a smart phone, a tablet computer or a wearable device. Also, the apparatus may be a computer such as a personal computer or a navigation system, and may be a display apparatus such as a television receiver or a digital signage system.

A first aspect of the embodiments provides a method for controlling a display device in a pulse width modulation (PWM) driving mode.

In a first embodiment of the first aspect, the method includes: obtaining, by a controller, a type of display contents which are displayed on the display device; and controlling, by the controller, a duty of PWM signals for driving the display device according to the type of the display contents, wherein the duty of the PWM signals is set to a first value if the type of the display contents is a video, and the duty of the PWM signals is set to a second value larger than the first value if the type of the display contents is a static-image.

In general, the motion blur is more perceptible as the duty of the PWM signals is larger, and the flicker is more perceptible as the duty of the PWM signals is smaller. Accordingly, in the first embodiment of the first aspect, the duty of the PWM signals is controlled to change in accordance with the type of display contents.

In an exemplary case, the first value is set to reduce the motion blur when the video is on display. In this case, when the contents type is switched to the static-image, the duty is controlled to change from the first value to the second value. Since the second value is set to be larger than the first value, the flicker may be reduced when the static-image is on display. Likewise, the duty is controlled to change from the second value to the first value when the contents type is switched to the video again, thereby reducing the motion blur. In this manner, the duty of the PWM signals is maintained at a preferable value in accordance with the contents type, so that improved display quality is achieved regardless of the contents type.

A second embodiment of the first aspect provides the method according to the first embodiment of the first aspect, wherein the first value is configured to increase from a minimum duty to a maximum duty as a brightness level of the display device increases from a first brightness level to a maximum brightness level.

In the second embodiment of the first aspect, when the video is on display, the duty of the PWM signals is maintained at the minimum duty if the brightness level is less than the first brightness level, and is controlled in accordance with brightness setting if the brightness level is larger than the first brightness level. According to the second embodiment of the first aspect, the motion blur may be efficiently reduced when the video is displayed.

A third embodiment of the first aspect provides the method according to the first or second embodiment of the first aspect, wherein the second value is configured to increase from a minimum duty to a maximum duty as a brightness level of the display device increases from a minimum brightness level to a second brightness level.

In the second embodiment of the first aspect, when the static-image is on display, the duty of the PWM signals is maintained at the maximum duty if the brightness level is larger than the second brightness level, and is controlled in accordance with brightness setting if the brightness level is smaller than the second brightness level. According to the third embodiment of the first aspect, the flicker may be efficiently reduced when the static-image is displayed.

A fourth embodiment of the first aspect provides the method according to any one of the first to third embodiments of the first aspect, wherein when the type of the display contents changes from the video to the static-image, the duty of the PWM signals is controlled to increase gradually from the first value to the second value, and when the type of the display contents changes from the static-image to the video, the duty of the PWM signals is controlled to decrease gradually from the second value to the first value.

According to the fourth embodiment of the first aspect, the duty of the PWM signals gradually changes after the type of the display contents is switched, thereby making it difficult to feel changes in the driving mode.

A fifth embodiment of the first aspect provides the method according to any one of the first to fourth embodiments of the first aspect, wherein the duty of the PWM signals is set to a third value larger than the first value if the type of the display contents is a type relevant to reading material.

When the reading material is on display, the flicker is more perceptible in an entire brightness level during the PWM driving. In the fifth embodiment of the first aspect, the duty of the PWM signals is set to the third value larger than the first value. For example, the third value may be a value making the display device to drive substantially in the DC driving mode. Accordingly, the flicker may be efficiently reduced when the reading material is displayed.

A sixth embodiment of the first aspect provides the method according to the fifth embodiment of the first aspect, wherein when the type of the display contents changes from the video or the static-image to the type, the duty of the PWM signals is controlled to increase gradually from the first or second value to the third value, and when the type of the display contents changes from the type to the video or the static-image, the duty of the PWM signals is controlled to decrease gradually from the third value to the first or second value.

According to the sixth embodiment of the first aspect, the duty of the PWM signals gradually changes after the type of the display contents is switched, thereby making it difficult to feel changes in the driving mode.

A seventh embodiment of the first aspect provides the method according to any one of the first to sixth embodiment of the first aspect, wherein the method further includes: controlling, by the controller, a pulse frequency of the PWM signals to be equal to a refresh rate if the type of the display contents is the video.

According to the seventh embodiment of the first aspect, the motion blur may be effectively reduced when the video is on display.

In an embodiment, the method may further include: obtaining, by the controller, metadata usable for determining the type of the display contents, and determining the type of the display contents based on the obtained metadata.

In an embodiment, the method may further include: estimating, by the controller, the type of the display contents based on differences between a current frame and at least one frame before the current frame.

A second aspect of the embodiments provides a display device.

In a first embodiment of the second aspect, the display device includes: a display panel, a driver for driving the display panel by using pulse width modulation (PWM) signals, and a controller for controlling the driver, wherein the controller is configured to perform: obtaining a type of display contents which are displayed on the display device; and controlling a duty of the PWM signals for driving the display device according to the type of the display contents, wherein the duty of the PWM signals is set to a first value if the type of the display contents is a video, and the duty of the PWM signals is set to a second value larger than the first value if the type of the display contents is a static-image.

According to the first embodiment of the second aspect, the duty of the PWM signals is controlled to change in accordance with the type of display contents. In an exemplary case, the first value is set to reduce the motion blur when the video is on display. In this case, when the contents type is switched to the static-image, the duty is controlled to change from the first value to the second value. Since the second value is set to be larger than the first value, the flicker may be reduced when the static-image is on display. Likewise, the duty is controlled to change from the second value to the first value when the contents type is switched to the video again, thereby reducing the motion blur. In this manner, the duty of the PWM signals is maintained at a preferable value in accordance with the contents type, so that improved display quality is achieved regardless of the contents type.

A second embodiment of the second aspect provides the display device according to the first embodiment of the second aspect, wherein the first value is configured to increase from a minimum duty to a maximum duty as a brightness level of the display device increases from a first brightness level to a maximum brightness level.

In the second embodiment of the second aspect, when the video is on display, the duty of the PWM signals is maintained at the minimum duty if the brightness level is less than the first brightness level, and is controlled in accordance with brightness setting if the brightness level is larger than the first brightness level. According to the second embodiment of the second aspect, the motion blur may be efficiently reduced when the video is displayed.

A third embodiment of the second aspect provides the display device according to the first or second embodiment of the second aspect, wherein the second value is configured to increase from a minimum duty to a maximum duty as a brightness level of the display device increases from a minimum brightness level to a second brightness level.

In the second embodiment of the second aspect, when the static-image is on display, the duty of the PWM signals is maintained at the maximum duty if the brightness level is larger than the second brightness level, and is controlled in accordance with brightness setting if the brightness level is smaller than the second brightness level. According to the third embodiment of the second aspect, the flicker may be efficiently reduced when the static-image is displayed.

A fourth embodiment of the second aspect provides the display device according to any one of the first to third embodiment of the second aspect, wherein when the type of the display contents changes from the video to the static-image, the controller controls the driver to cause the duty of the PWM signals to increase gradually from the first value to the second value, and when the type of the display contents changes from the static-image to the video, the controller controls the driver to cause the duty of the PWM signals to decrease gradually from the second value to the first value.

According to the fourth embodiment of the second aspect, the duty of the PWM signals gradually changes after the type of the display contents is switched, thereby making it difficult to feel changes in the driving mode.

A fifth embodiment of the second aspect provides the display device according to any one of the first to fourth embodiment of the second aspect, wherein the duty of the PWM signals is set to a third value larger than the first value.

When the reading material is on display, the flicker is more perceptible in an entire brightness level during the PWM driving. In the fifth embodiment of the second aspect, the duty of the PWM signals is set to the third value larger than the first value. For example, the third value may be a value making the display device to drive substantially in the DC driving mode. Accordingly, the flicker may be efficiently reduced when the reading material is displayed.

A sixth embodiment of the second aspect provides the display device according to the fifth embodiment of the second aspect, wherein when the type of the display contents changes from the video or the static-image to the type, the controller controls the driver to cause the duty of the PWM signals to increase gradually from the first or second value to the third value, and when the type of the display contents changes from the type to the video or the static-image, the controller controls to cause the duty of the PWM signals to decrease gradually from the third value to the first or second value.

According to the sixth embodiment of the second aspect, the duty of the PWM signals gradually changes after the type of the display contents is switched, thereby making it difficult to feel changes in the driving mode.

A seventh embodiment of the second aspect provides the display device according to any one of the first to sixth embodiments of the second aspect, wherein the controller is further configured to perform: controlling a pulse frequency of the PWM signals to be equal to a refresh rate if the type of the display contents is the video.

According to the seventh embodiment of the second aspect, the motion blur may be effectively reduced when the video is on display.

In an embodiment, the controller may be further configured to perform: obtaining metadata usable for determining the type of the display contents, and determining the type of the display contents based on the obtained metadata.

In an embodiment, the controller may be further configured to perform: estimating the type of the display contents based on differences between a current frame and at least one frame before the current frame.

A third aspect of the embodiments provides an apparatus including: a processor and the display device according to any one of the first to seventh embodiments of the second aspect, wherein the processor is configured to input data for displaying the display contents to the display device.

A fourth aspect of the embodiments provides a non-transitory computer readable storage medium that stores a computer program to cause a computer to perform the method according to any one of the first to seventh embodiments of the first aspect.

A fifth aspect of the embodiments provides a computer program to cause a computer to perform the method according to any one of the first to seventh embodiments of the first aspect.

A sixth aspect of the embodiments provides a method for controlling a display device in a pulse width modulation (PWM) driving mode, wherein the method comprising: determining, by a controller, that a type of display contents which are displayed on the display device is a video; and controlling, by the controller, a frequency of PWM signals for driving the display device to be equal to a refresh rate of the display device.

A seventh aspect of the embodiments provides a display device comprising: a display panel, a driver for driving the display panel by using pulse width modulation (PWM) signals, and a controller for controlling the driver, wherein the controller is configured to perform: determining, by a controller, that a type of display contents which are displayed on the display device is a video; and controlling, by the controller, a frequency of PWM signals for driving the display device to be equal to a refresh rate of the display device.

A eighth aspect of the embodiments provides an apparatus comprising: a processor and the display device according to the seventh aspect of the embodiments, wherein the processor is configured to input data for displaying the display contents to the display device.

A ninth aspect of the embodiments provides a non-transitory computer-readable storage medium that stores a program to cause a computer to perform the method according to the sixth aspect of the embodiments.

DESCRIPTION OF EMBODIMENTS

The following describes technical solutions of the embodiments, referring to the accompanying drawings. It will be understood that the embodiments described below are not all but just some of embodiments relating to the present disclosure. It is to be noted that all other embodiments which may be derived by one of ordinary skilled in the art based on the embodiments described below without creative efforts shall fall within the protection scope of the present disclosure.

Embodiments described below relates to a method for controlling a display device, the display device, and an apparatus with which the display device is equipped. For example, the embodiments relates to a method for controlling a display device in a pulse width modulation (PWM) driving mode.

Figure 1:
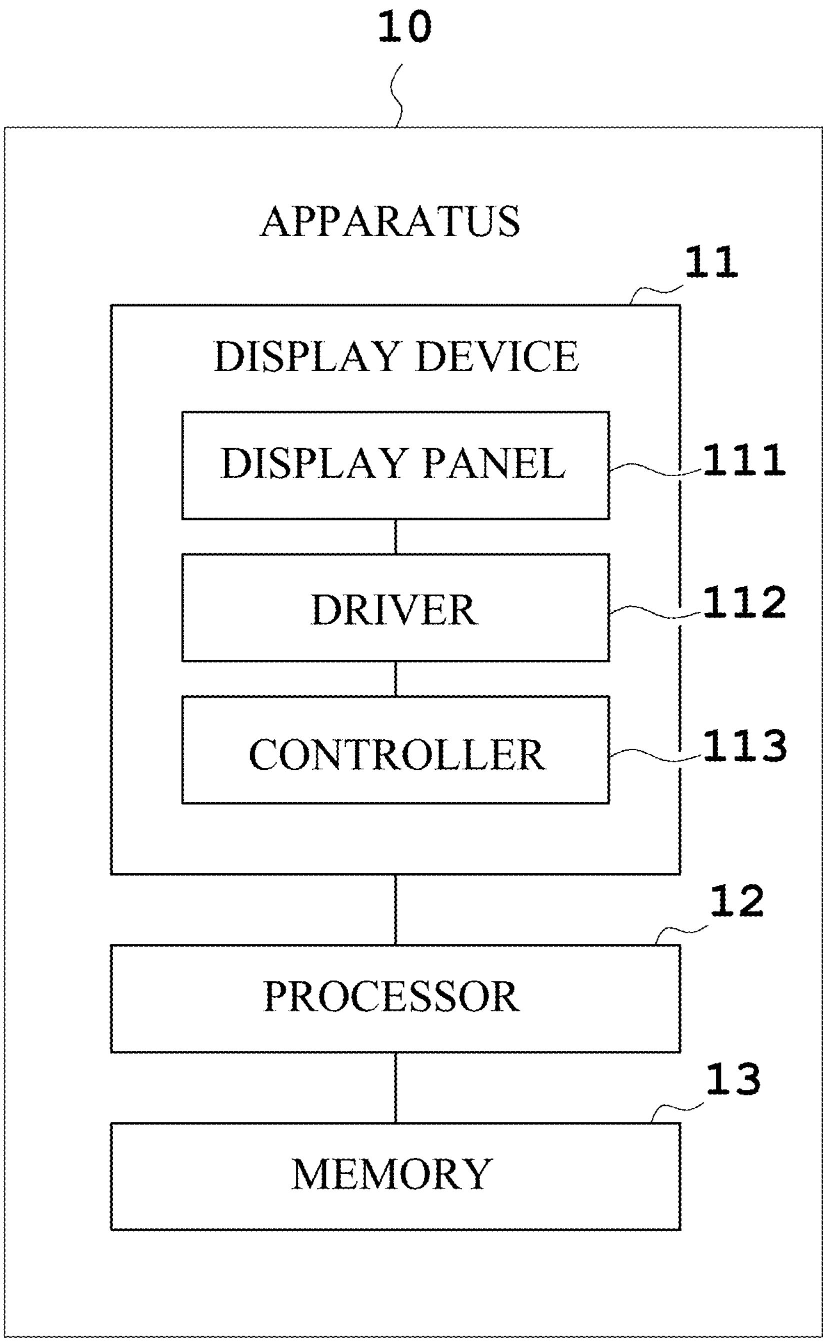
FIG. 1 is a schematic block diagram for describing exemplary configuration of an apparatus according to an embodiment of the present disclosure, FIG. 2 schematically shows an exemplary structure of a display panel according to the embodiment of the present disclosure.

(Configuration of the apparatus) FIG. 1 is a schematic block diagram for describing exemplary configuration of an apparatus according to an embodiment of the present disclosure. Apparatus 10 shown in FIG. 1 is an example of the apparatus according to the embodiment of the present disclosure.

For example, the apparatus 10 may be an electronic apparatus such as a mobile phone, a smart phone, a tablet device, a personal computer, a television receiver, a portable multimedia player, a wearable device, a digital signage system, or a navigation system. These are merely examples and are not intended to limit a scope of the apparatus to which techniques of the embodiments described herein are applicable.

As shown in FIG. 1, the apparatus 10 comprises a display device 11, a processor 12, and a memory 13. In an embodiment, the apparatus 10 may further comprise communication circuitry such as high frequency circuitry usable for a wired and/or wireless communication interface, an optical communication interface or the like.

For example, the display device 11 may be an OLED display, a LCD, a micro-LED display, a mini-LED display or the like. The processor 12 may be a central processing unit (CPU), a field-programmable gate array (FPGA), an application specific integrated circuit (ASIC), a graphics processing unit (GPU) or the like. The memory 13 may be a read only memory (ROM), a random access memory (RAM), a hard disk drive (HDD), a solid state drive (SSD), a flash-memory or the like.

The processor 12 is configured to control operation of the apparatus 10. For example, the processor 12 may perform operation for displaying contents on the display device 11 according to a program stored in the memory 13. In some exemplary cases, the program may be provided via a non-transitory computer readable storage medium or a network such as a local area network, a wide area network or a combination of these networks.

In an example of FIG. 1, the display device 11 comprises a display panel 111, a driver 112 and a controller 113.

Figure 2:
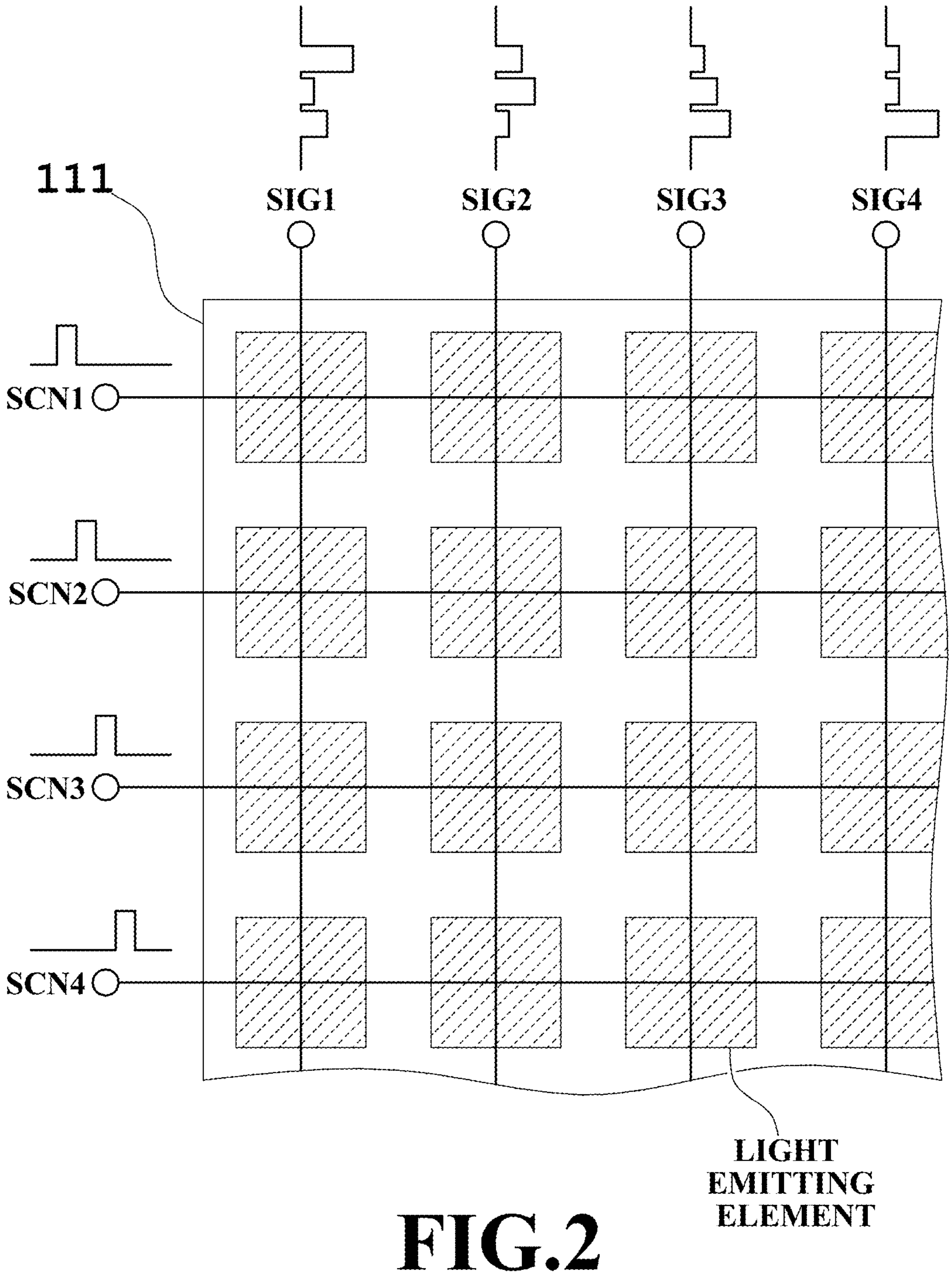

If the display device 11 is the OLED display, the display panel 111 includes a plurality of pixels each having at least one light emitting (LE) element as shown in FIG. 2. FIG. 2 schematically shows an exemplary structure of a display panel according to the embodiment of the present disclosure.

In a case of an active-matrix type, the LE element is an OLED, and each LE element is driven by a thin-film transistor (TFT) located at a position of a corresponding LE element. Scan and signal lines are arranged so as to cross at a position of each LE element and connect to the TFTs, and voltage pulses (SIG1 . . . SCN1 . . . ) pass through the scan and signal lines to operate the TFTs.

The structure of the display panel 111 shown in FIG. 2 is merely an example thereof, and is not intended to limit a scope of the display panel to which techniques of the embodiments described herein are applicable. For example, the techniques of the embodiments are applicable to a passive-matrix type display as well as a LCD, a micro-LED display, a mini-LED display or the like.

The driver 112 controls the voltage pulses passing through the signal lines according to image signals from the controller 113 to display contents on the display panel 111. Also, the driver 112 may control a width and/or frequency of the voltage pulses passing through the scan and/or signal lines according to indication from the controller 113. The controller 113 controls the driver 112 to drive the display panel 111 in the PWM or DC driving mode, and to change a duty of PWM signals according to a type of contents displaying on the display panel 111, as described below.

In the DC driving mode, the LE element is controlled to maintain a brightness level according to an image during an entire refresh period. The refresh period herein means a period from the current update of an entire display area on the display panel 111 to the next update of the entire display area thereon. In a case that a refresh rate of the display panel 111 is synchronized with a frame rate of a video, the refresh period is equal to a length of a single frame. The following description proceeds based on this exemplary case for simplicity of the description, and hereafter the terms "refresh period" and "frame" may be used interchangeably regardless of the type of the contents displaying on the display panel 111.

Figure 3:
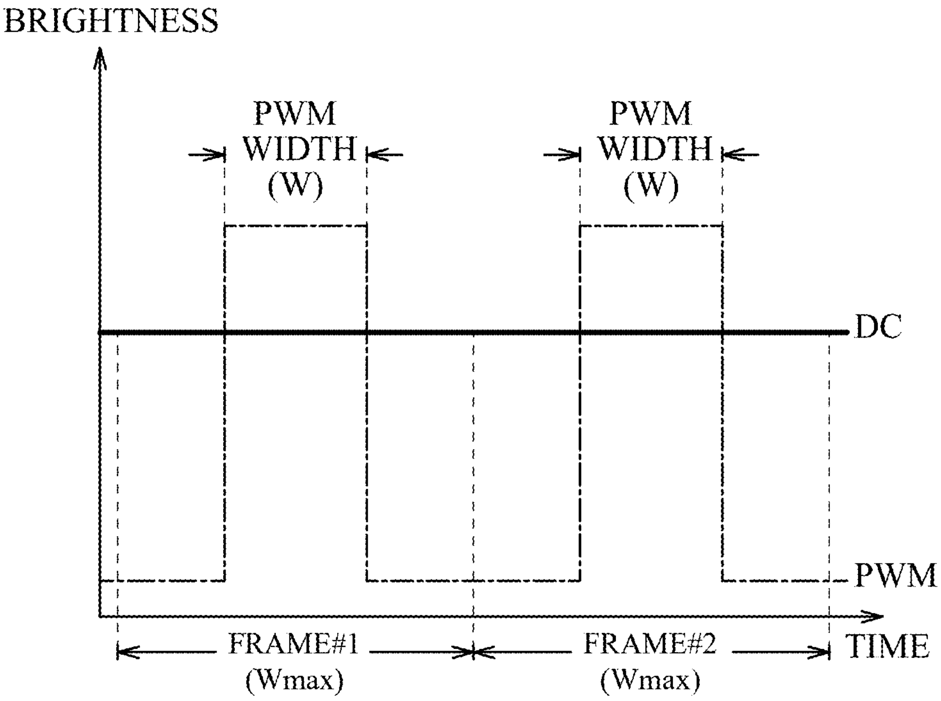
FIG. 3 is a schematic diagram for describing DC driving and PWM driving on a display device according to the embodiment of the present disclosure.

In the PWM driving mode, the brightness level of the LE element is controlled based on the image as well as a PWM pulse sequence in which a width of each PWM pulse is configured to be smaller than the length of the single frame, as shown in FIG. 3. FIG. 3 is a schematic diagram for describing DC driving and PWM driving on a display device according to the embodiment of the present disclosure. In FIG. 3, a solid line indicates a brightness level in the DC driving mode, and a dash-dot line indicates the PWM pulse sequence in the PWM driving mode.

In an example of FIG. 3, a single PWM pulse appears in each frame (e.g. frame #1, frame #2 . . . ), and a width of the PWM pulse ("PWM width" for short) is configured to be smaller than a width of each frame. If the PWM width is W and the width of each frame is Wmax, the duty of the PWM pulse ("PWM duty" for short) is defined by W/Wmax. In an embodiment, the PWM duty (D) may be defined as the following equation: $D=100*W/Wmax$ [%]. This represents a percentage of the PWM pulse in the single frame. If D=100 [%], a driving mode of the display panel 111 is substantially equal to the DC driving mode.

(Flicker and Motion blur) Following describes a flicker that is perceptible when displaying a static-image in the PWM driving mode, and a motion blur that is perceptible when displaying a video in the DC driving mode.

As mentioned above, the PWM duty may be less than 100% in the PWM driving mode. If the static-image is on display, the image is continuously displayed on the same location during multiple frames until replacement of the image will occur. In the DC driving mode, the image is continuously displayed during an entire period of the multiple frame, thereby avoiding the flicker. In the PWM driving mode, the image is on display during only a partial period in each of the multiple frames, so that the flicker is more perceptible in a case of a small PWM duty.

On the other hand, the PWM driving mode has advantage for reducing the motion blur that may be perceptible when the video is on display.

Figure 4:
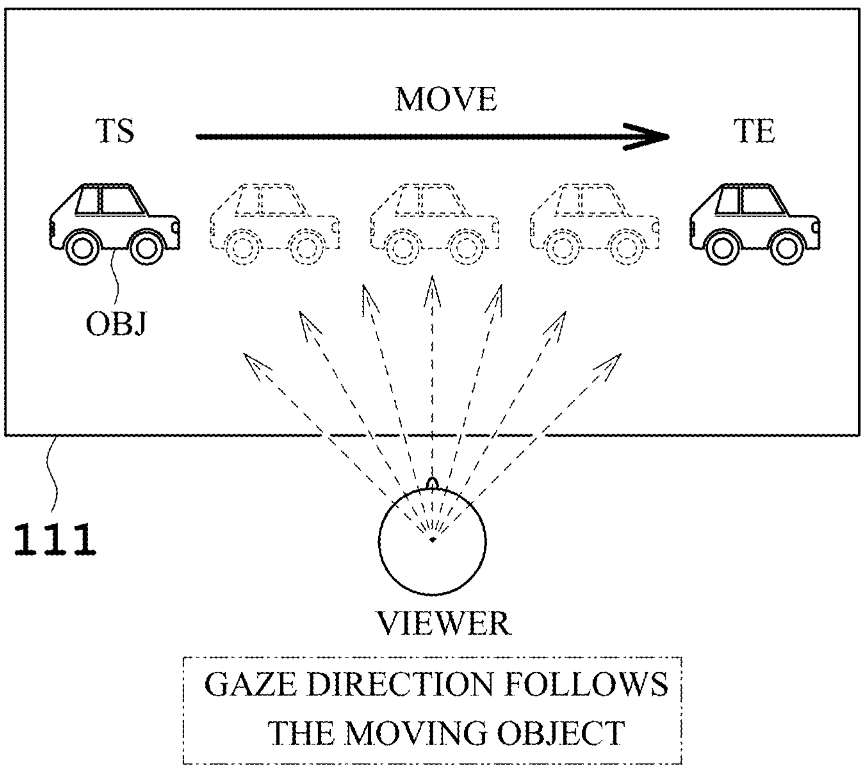
FIG. 4 is a schematic diagram for describing a gaze direction of a viewer viewing a moving object.

When the viewer watches the contents including the moving object, a gaze direction of the viewer follows the moving object on display, as shown in FIG. 4. FIG. 4 is a schematic diagram for describing the gaze direction of the viewer viewing the moving object. In an example of FIG. 4, the moving object OBJ moves from the left to right in the display area during a moving period from TS to TE. Although displayed positions of the moving object respectively corresponding to multiple frames in the moving period are discrete, the gaze direction moves continuously from the left to right and the viewer may recognize as if the moving object continuously moves. At this time, the viewer's brain is creating a residual image for complementing the moving object at an intermediate position between the adjacent frames.

Figure 5A:
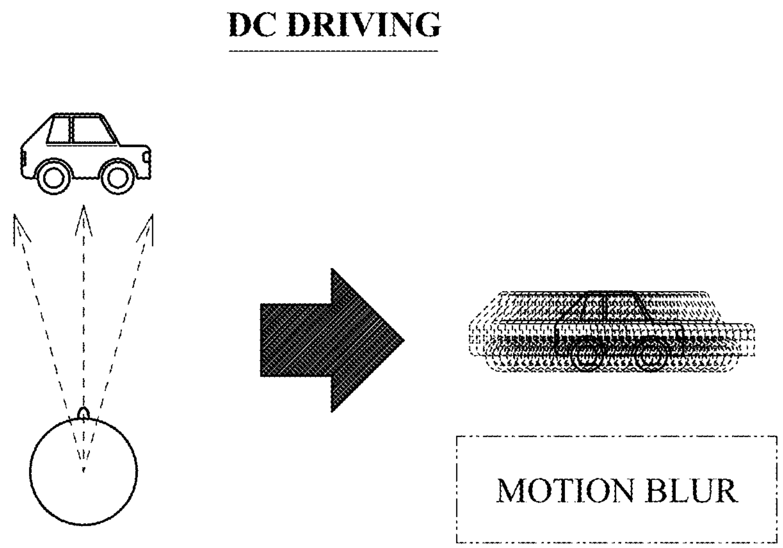
FIG. 5A is a schematic diagram for describing motion blur that appears during the DC driving.
Figure 5B:
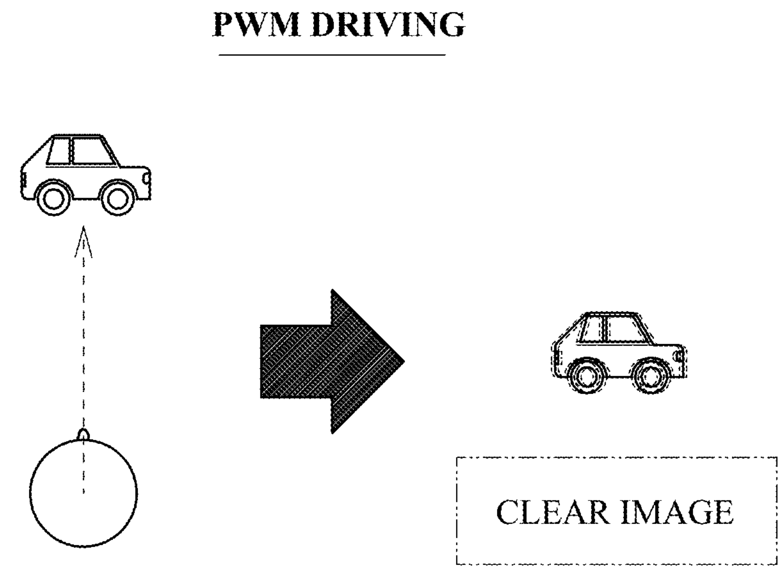
FIG. 5B is a schematic diagram for describing reduction of the motion blur when the PWM driving is applied to the display device.

In the DC driving mode, an actual image of the moving object is displayed at a position different from a position of the residual image during most of each frame in the moving period, as shown in FIG. 5A. Accordingly, the motion blur is more perceptible in the DC driving mode. FIG. 5A is a schematic diagram for describing motion blur that appears during the DC driving. In the PWM driving mode, an actual image of the moving object is displayed during only a partial period of each frame, so that a duration that the actual image away from the residual image is on display is short. Accordingly, the motion blur is less perceptible in the PWM driving mode, as shown in FIG. 5B. FIG. 5B is a schematic diagram for describing reduction of the motion blur when the PWM driving is applied to the display device.

As described above, the motion blur is more perceptible as the PWM duty is larger, and the flicker is more perceptible as the PWM duty is smaller. Accordingly, in the embodiment of the present disclosure, the PWM duty is controlled by the controller 113, to change in accordance with the type of contents on display.

For example, the controller 113 is configured to perform: obtaining a type of the contents on display, and controlling the PWM duty for driving the display panel 111 via the driver 112 according to the obtained contents type. The PWM duty may be set to a first value if the contents type is the video, and the PWM duty may be set to a second value larger than the first value if the contents type is the static-image.

Figure 6A:
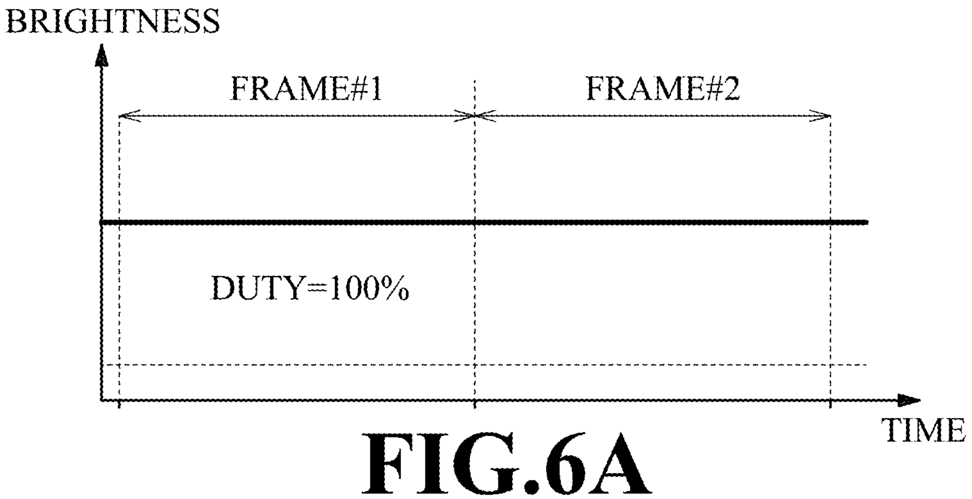
FIGS. 6A to 6C are schematic diagrams for describing a method to control a width of each pulse which is input to light emitting elements according to the embodiment of the present disclosure.
Figure 6B:
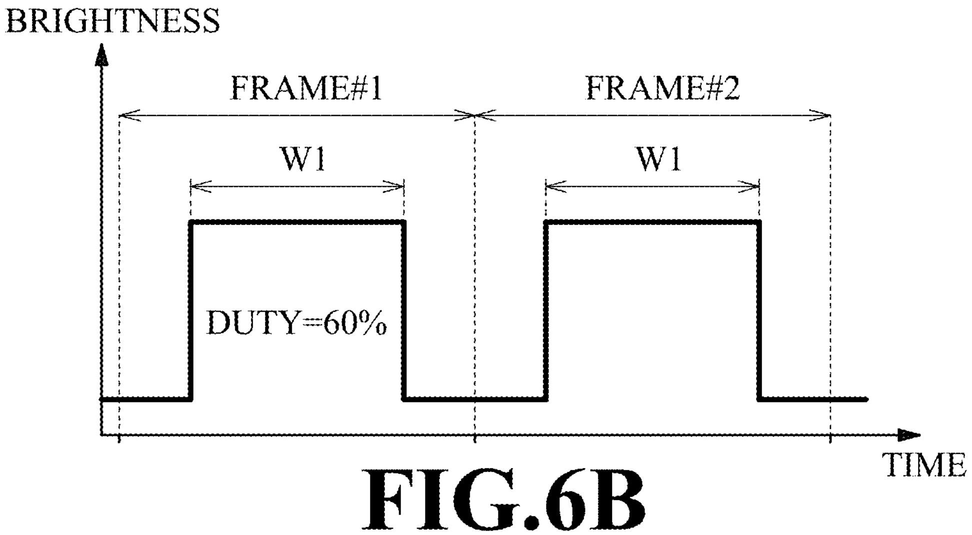
Figure 6C:
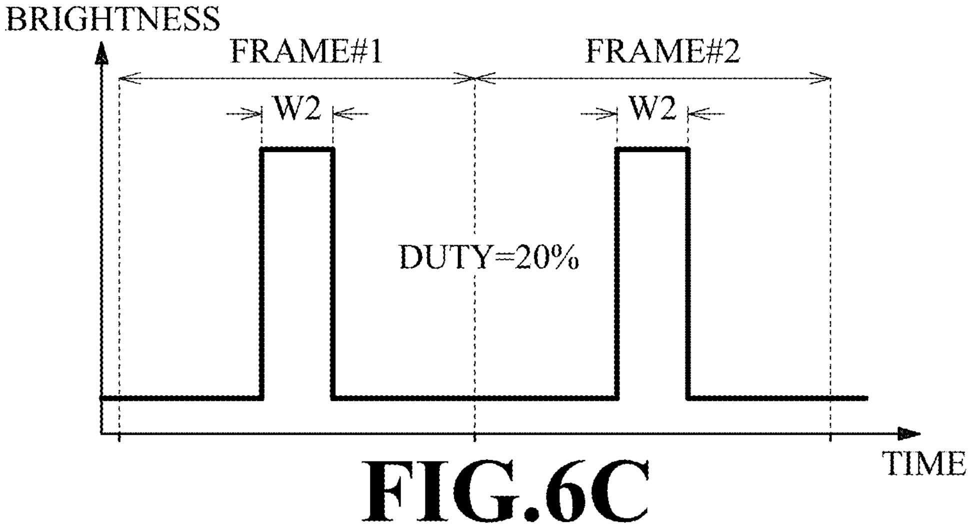

In an exemplary case, the controller 113 may set the PWM duty to 20% (see FIG. 6C) when the video is on display, and may set the PWM duty to 100% (see FIG. 6A) when the static-image is on display. Also, the controller 113 may set the PWM duty to 60% (see FIG. 6B) when the static-image is on display. FIGS. 6A to 6C are schematic diagrams for describing a method to control a width of each pulse which is input to light emitting elements according to the embodiment of the present disclosure. When changing the PWM duty, the controller 113 may control the brightness value of each PWM pulse according to the PWM duty so as to maintain a total brightness value in a frame to a given value based on brightness setting.

Figures 7A, 7B:
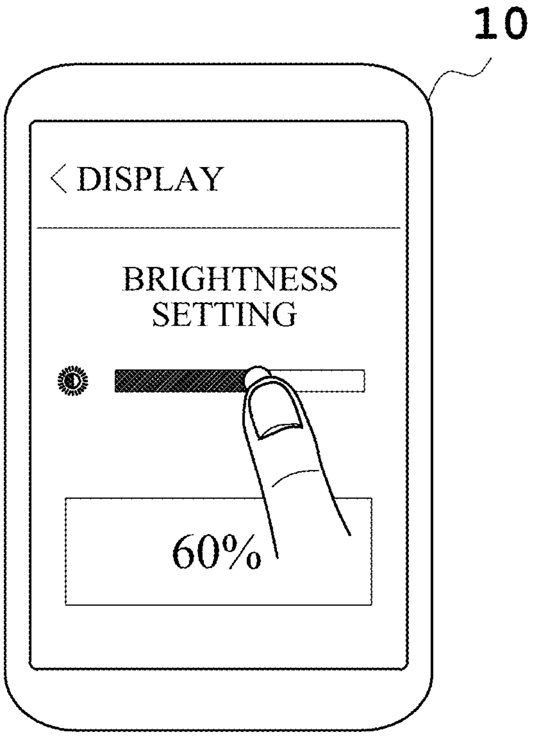
FIG. 7A is a schematic diagram for describing a brightness setting function of the display device according to the embodiment of the present disclosure.
FIG. 7B is a chart diagram for describing preferable driving manners relevant to combinations of a contents type and a brightness setting on the display device, according to the embodiment of the present disclosure.

The brightness setting may be implemented on a brightness setting screen as shown in FIG. 7A. FIG. 7A is a schematic diagram for describing a brightness setting function of the display device according to the embodiment of the present disclosure. For example, when the viewer operates the apparatus 10 to invoke a brightness setting function of the apparatus 10, the brightness setting screen is displayed on the display panel 111. In an example of FIG. 7A, the brightness setting screen includes a bar for changing the brightness setting and a current brightness level (e.g. 60%), and the viewer may change the brightness level by sliding the bar.

The controller 113 may change the PWM duty according to both the contents type and the brightness setting, as shown in FIG. 7B. FIG. 7B is a chart diagram for describing preferable driving manners relevant to combinations of a contents type and a brightness setting on the display device, according to the embodiment of the present disclosure.

In an example of FIG. 7B, the controller 113 may drive the display panel 111 in the PWM driving mode with a low PWM duty, when the brightness level is set to a value in a low range (Low) and the contents type is the video (Type #1) or the static-image (Type #2). Also, the controller 113 may drive the display panel 111 in the PWM driving mode with a high PWM duty, when the brightness level is set to a value in a high range (High) and the contents type is the video (Type #1).

When the brightness level is set to a value in a middle range (Middle) and the contents type is the video (Type #1) or the static-image (Type #2), the controller 113 may drive the display panel 111 in the PWM driving mode with a moderate PWM duty. Also, the controller 113 may drive the display panel 111 in the DC driving mode corresponding to a case that the PWM duty is 100%, when the brightness level is set to a value in a high range (High) and the contents type is the static-image (Type #2).

In a case that the contents type is reading material (Type #3) such as a comic, a novel, a journal or a newspaper, the flicker is more perceptible in the PWM driving mode regardless of the brightness setting. Accordingly, the controller 113 may drive the display panel 111 in the DC driving mode, when the contents type is the reading material (Type #3) regardless of the brightness setting. The brightness in such reading material is expressed by using a shading expression image (e.g. screen tone) displayed by two grades which are usually "white" and "black". Accordingly, higher bit accuracy is not required and the DC driving mode is always acceptable when displaying such reading material.

Figure 8A:
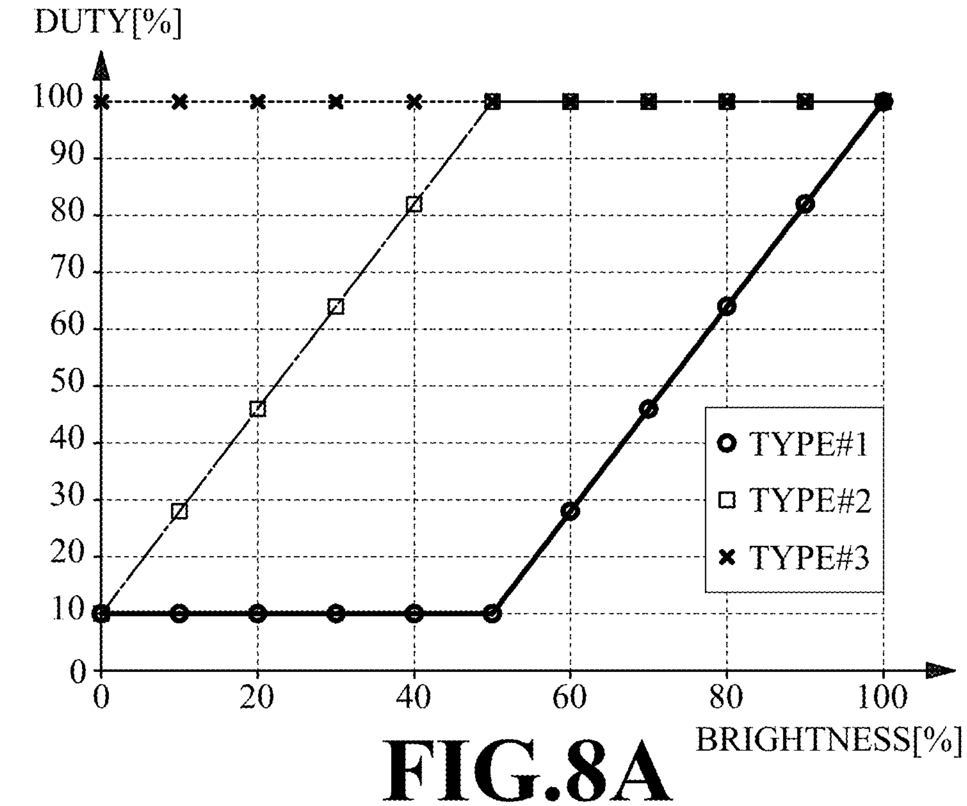
FIG. 8A is a schematic diagram for describing a method to control a PWM duty in accordance with the content type and the brightness setting, according to the embodiment of the present disclosure.

In an embodiment, the PWM duty may be controlled by a method shown in FIG. 8A. FIG. 8A is a schematic diagram for describing a method to control a PWM duty in accordance with the content type and the brightness setting, according to the embodiment of the present disclosure.

In FIG. 8A, a solid line and circles thereon indicate a control method of the PWM duty when the contents type is Type #1 (Video), a dash-dot line and squares thereon indicate the control method when the contents type is Type #2 (Static-image), and a dashed line and cross-marks thereon indicate the control method when the contents type is Type #3 (Reading material).

Referring to the solid line in FIG. 8A, the PWM duty is configured to increase from a minimum duty (e.g. 10%) to a maximum duty (e.g. 100%) as a brightness level set by the brightness setting increases from a first brightness level (e.g. 50%) to a maximum brightness level (e.g. 100%). The controller 113 may control the PWM duty according to the solid line of FIG. 8A when the contents type is Type #1.

Referring the dash-dot line in FIG. 8A, the PWM duty is configured to increase from a minimum duty (e.g. 10%) to a maximum duty (e.g. 100%) as a brightness level set by the brightness setting increases from a minimum brightness level (e.g. 10%) to a second brightness level (e.g. 50%). Although the first brightness level is equal to the second brightness level in an example of FIG. 8A, the first brightness level may be different from the second brightness level. The controller 113 may control the PWM duty according to the dash-dot line of FIG. 8A when the contents type is Type #2.

Referring to the dashed line in FIG. 8A, the PWM duty is configured to be the maximum duty (e.g. 100%) regardless of the brightness setting. The controller 113 may control the PWM duty according to the dashed line of FIG. 8A when the contents type is Type #3. Namely, the controller 113 may control the display panel 111 to drive in the DC driving mode when the reading material is on display.

Figure 8B:
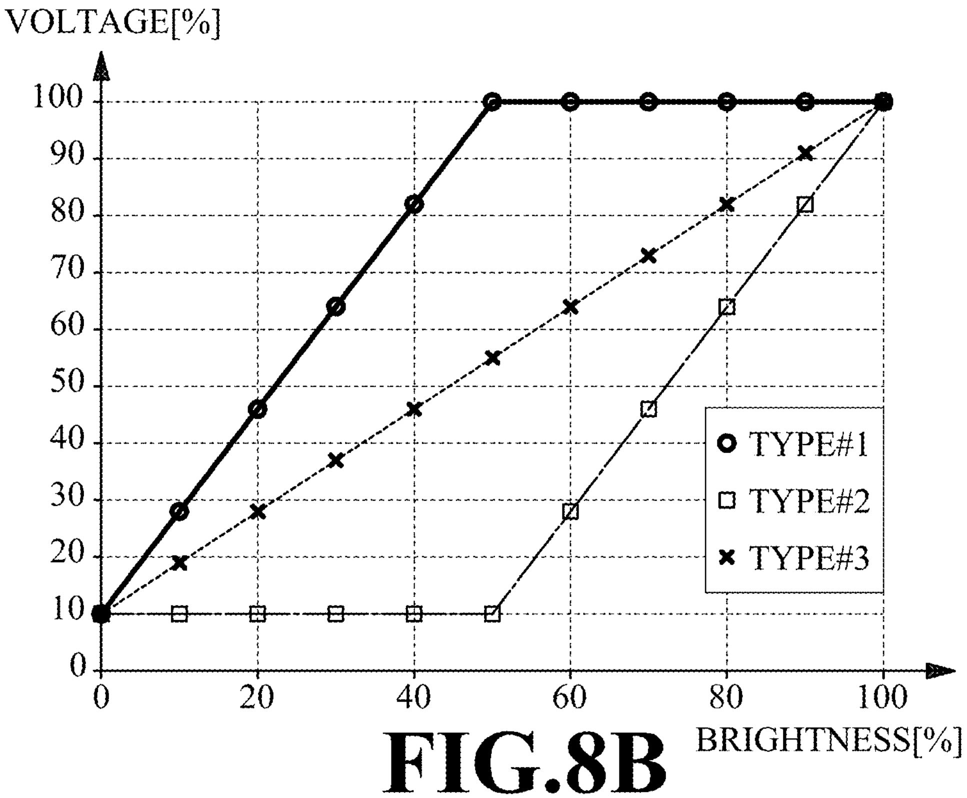
FIG. 8B is a schematic diagram for describing a method to control a voltage corresponding to amplitude of each pulse in accordance with the content type and the brightness setting, according to the embodiment of the present disclosure.

If the controller 113 controls the PWM duty according to the methods shown in FIG. 8A, the controller 113 may also control a voltage corresponding to an amplitude of each PWM pulse so as to maintain the brightness level set by the brightness setting in each frame, as shown in FIG. 8B. FIG. 8B is a schematic diagram for describing a method to control the voltage corresponding to amplitude of each pulse in accordance with the content type and the brightness setting, according to the embodiment of the present disclosure.

According to the above-described methods, the flicker may be reduced when the static-image or the reading material is on display, and the motion blur may also be reduced when the video is on display, thereby effectively improving display quality regardless of the contents type.

Figure 9:
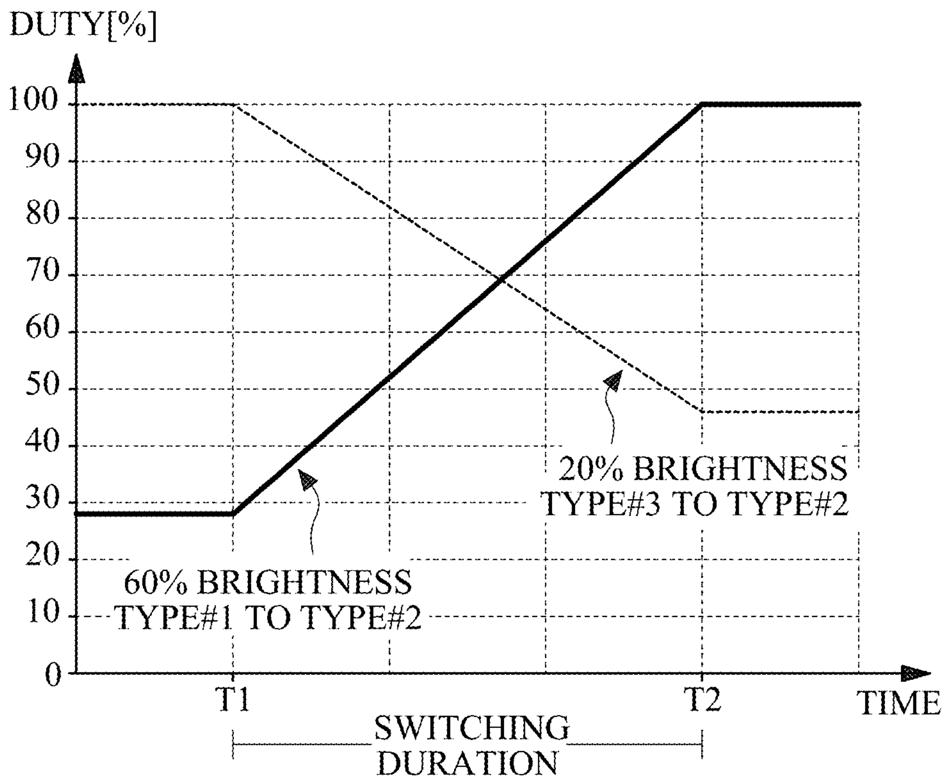
FIG. 9 is a schematic diagram for describing a method to control the PWM duty to gradually increase or decrease during a switching duration after changing the contents type, according to the embodiment of the present disclosure.

(Switching manner) Following describes a switching manner for switching between the control methods of the PWM duty shown in FIG. 8A, with reference to FIG. 9. FIG. 9 is a schematic diagram for describing a method to control the PWM duty to gradually increase or decrease during a switching duration after changing the contents type, according to the embodiment of the present disclosure.

In FIG. 9, a solid line represents an exemplary case that the brightness level is set to 60% and the contents type changes from Type #1 (Video) to Type #2 (Static-image), and a dashed line represents another exemplary case that the brightness level is set to 20% and the contents type changes from Type #3 (Reading material) to Type #2 (Static-image). Also, T1 is a start time of a switching operation, T2 is an end time thereof, and a switching duration is a duration for the switching operation.

Referring to the solid line in FIG. 9, the PWM duty at T1 is a value under a first condition that the brightness level is set to 60% and the contents type is Type #1, and the PWM duty at T2 is a value under a second condition that the brightness level is set to 60% and the contents type is Type #2. If the PWM duty suddenly changes from the value under the first condition to the value under the second condition, the viewer may have uncomfortable feeling. Accordingly, when the contents type changes from Type #1 (Video) to Type #2 (Static-image), the controller 113 may control the driver 112 to cause the PWM duty to increase gradually from the value under the first condition to the value under the second condition according to the solid line in FIG. 9.

Likewise, when the contents type changes from Type #2 (Static-image) to Type #1 (Video), the controller 113 may control the driver 112 to cause the PWM duty to decrease gradually from the value under the second condition to the value under the first condition according to the solid line in FIG. 9.

Referring to the dashed line in FIG. 9, the PWM duty at T1 is a value under a third condition that the brightness level is set to 20% and the contents type is Type #3, and the PWM duty at T2 is a value under a fourth condition that the brightness level is set to 20% and the contents type is Type #2. In this case, when the contents type changes from Type #3 (Reading material) to Type #2 (Static-image), the controller 113 may control the driver 112 to cause the PWM duty to decrease gradually from the value under the third condition to the value under the fourth condition according to the dashed line in FIG. 9.

Likewise, when the contents type changes from Type #2 (Static-image) to Type #3 (Reading material), the controller 113 may control the driver 112 to cause the PWM duty to increase gradually from the value under the fourth condition to the value under the third condition according to the dashed line in FIG. 9. In addition, when the contents type changes from Type #1 (Video) to Type #3 (Reading material), the controller 113 may control the driver 112 to cause the PWM duty to increase gradually in the similar manner. Also, when the contents type changes from Type #3 (Reading material) to Type #1 (Video), the controller 113 may control the driver 112 to cause the PWM duty to decrease gradually in the similar manner.

Although the PWM duty linearly changes during the switching duration in the example of FIG. 9, the controller 113 may control the PWM duty to change non-linearly. According to the switching manner mentioned above, the PWM duty changes gradually when switching the contents type, thereby reducing the uncomfortable feeling.

Figure 10:
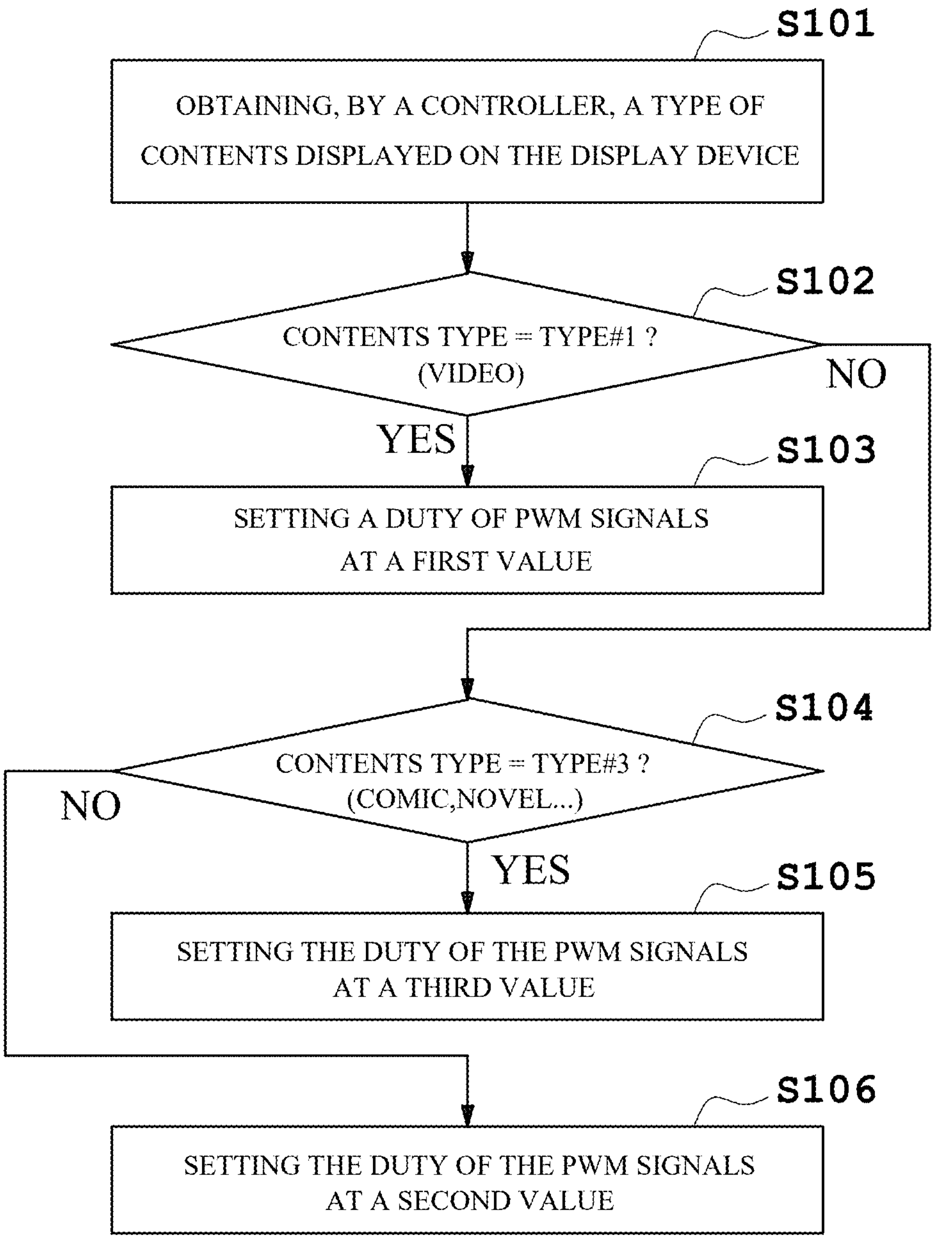
FIG. 10 shows a flowchart for describing operation of the display device according to the embodiment of the present disclosure.

(Operation of the display device) Following describes operation of the display device 10, with reference to FIG. 10. FIG. 10 shows a flowchart for describing operation of the display device according to the embodiment of the present disclosure.

At an operation S101, the controller 113 perform: obtaining a type of contents which are displayed on the display device 11. For example, the controller 113 may detect the contents type based on metadata obtained from an application program running on the apparatus 10. Alternatively, the controller 113 may detect the contents type based on analysis of the contents on display.

At an operation S102, the controller 113 determines whether the contents type is Type #1 (Video) or not. If the contents type is Type #1, processing proceeds to an operation S103. On the other hand, if the contents type is not Type #1, the processing proceeds to an operation S104.

At an operation S103, the controller 113 perform: setting a duty of PWM signals at a first value corresponding to Type #1. For example, the controller 113 may set the PWM duty based on the solid line in FIG. 8A and the brightness setting on the apparatus 10. After completing the operation S103, the processing may proceed to the operation S101.

At an operation S104, the controller 113 determines whether the contents type is Type #3 (Reading material) or not. If the contents type is Type #3, the processing proceeds to an operation S105. On the other hand, if the contents type is not Type #3, the processing proceeds to an operation S106.

At an operation S105, the controller 113 perform: setting the PWM duty at a third value corresponding to Type #3. For example, the controller 113 may set the PWM duty based on the dashed line in FIG. 8A and the brightness setting on the apparatus 10. In this case, the PWM duty is set to the maximum duty (e.g. 100%) regardless of the brightness setting. After completing the operation S105, the processing may proceed to the operation S101.

At an operation S106, the controller 113 perform: setting the PWM duty at a second value corresponding to Type #2 (Static-image). For example, the controller 113 may set the PWM duty based on the dash-dot line in FIG. 8A and the brightness setting on the apparatus 10. After completing the operation S106, the processing may proceed to the operation S101.

As mentioned above, the controller 113 perform: controlling the PWM duty according to the contents type on display, wherein the PWM duty is set to the first value if the contents type is Type #1 (Video), the second value if the contents type is Type #2 (Static-image), or the third value if the contents type is Type #3 (Reading material). Accordingly, the flicker may be reduced when the static-image or the reading material is on display, and the motion blur may also be reduced when the video is on display, thereby effectively improving display quality regardless of the contents type.

(Variation of the embodiment) Following describes a variation of the embodiment. The variation relates to a relation between a PWM frequency and the refresh rate on the display device 11. The PWM frequency may be defined as the number of pulses per one second herein.

Figure 11:
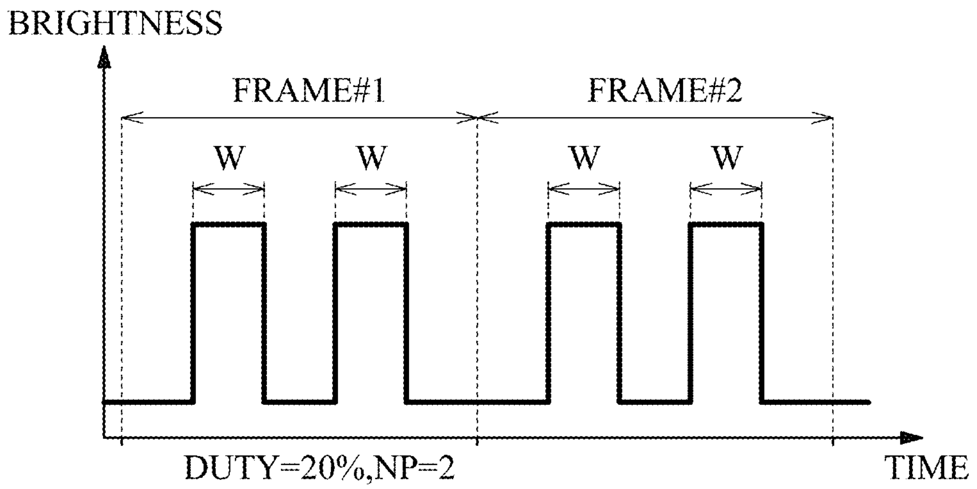
FIG. 11 is a schematic diagram for describing control of PWM frequency according to a variation of the embodiment.

For example, if the PWM frequency is configured to set the number of pulses in a single frame at 2 (NP=2), the PWM pulse sequence is as shown in FIG. 11. FIG. 11 is a schematic diagram for describing control of PWM frequency according to a variation of the embodiment.

Figure 12A:
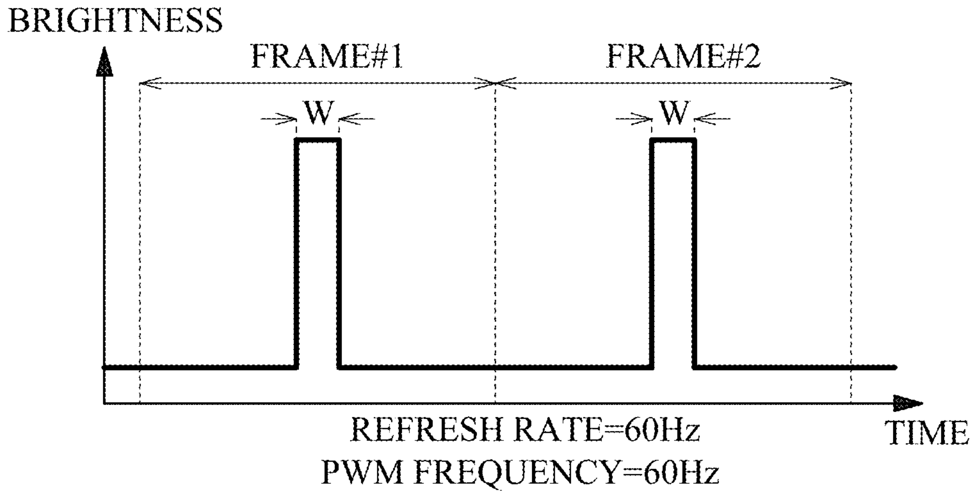
FIGS. 12A and 12B are schematic diagrams for describing a method to control the PWM frequency in accordance with a refresh rate, according to the variation of the embodiment.
Figure 12B:
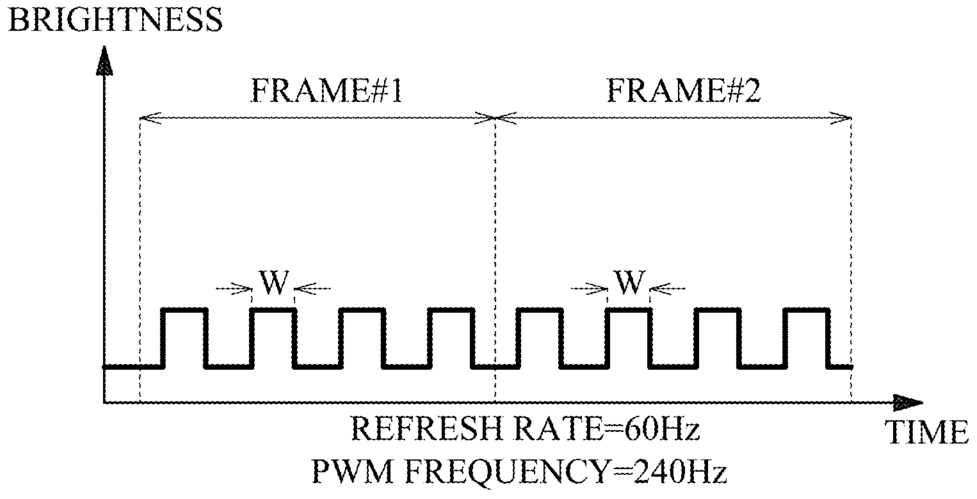

For example, the PWM pulse sequence is as shown in FIG. 12A if the refresh rate of the display device 11 is set to 60 Hz and the PWM frequency is also set to 60 Hz. Namely, each frame is configured to include one pulse (NP=1) when the refresh rate is equal to the PWM frequency. If the refresh rate of the display device 11 is set to 60 Hz and the PWM frequency is set to 240 Hz, each frame is configured to include four pulses (NP=4) as shown in FIG. 12B. In this way, the controller 113 may control the number of pulses (NP) in each frame variously by changing the PWM frequency.

In the variation of the embodiment, the controller 113 controls the PWM frequency so that each frame includes only one pulse when the contents type is Type #1 (Video). This enables to effectively reduce the motion blur that is more perceptible as the number of pulses in each frame increases.

Figure 13:
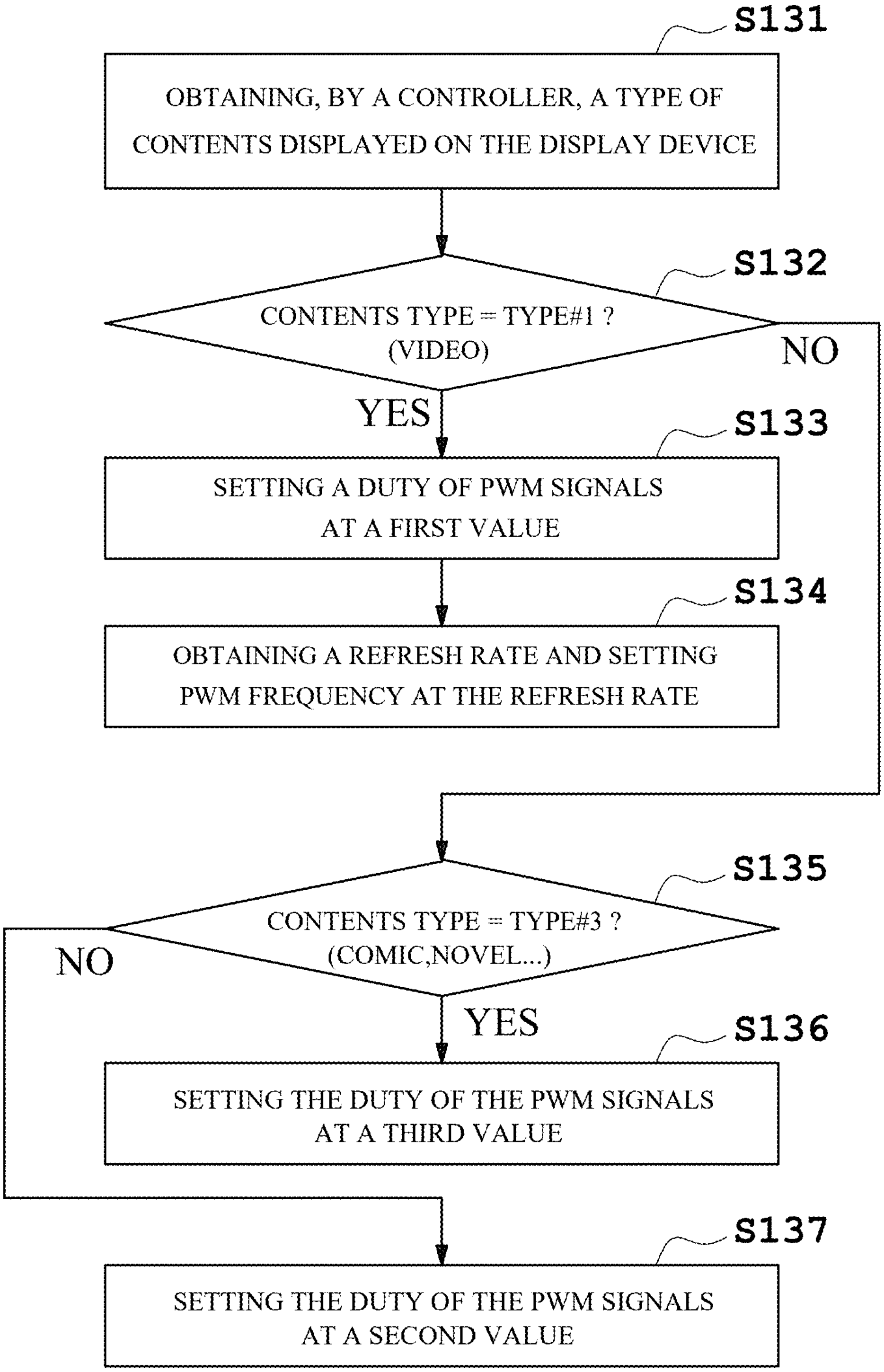
FIG. 13 shows a flowchart for describing operation of the display device according to the variation of the embodiment.

If the variation of the embodiment above is applied to the operation of the display device shown in FIG. 10, the operation is as shown in FIG. 13. FIG. 13 shows a flowchart for describing operation of the display device according to the variation of the embodiment.

At an operation S131, the controller 113 perform: obtaining a type of contents which are displayed on the display device 11. For example, the controller 113 may detect the contents type based on metadata obtained from an application program running on the apparatus 10. Alternatively, the controller 113 may detect the contents type based on analysis of the contents on display.

At an operation S132, the controller 113 determines whether the contents type is Type #1 (Video) or not. If the contents type is Type #1, processing proceeds to an operation S133. On the other hand, if the contents type is not Type #1, the processing proceeds to an operation S135.

At an operation S133, the controller 113 perform: setting a duty of PWM signals at a first value corresponding to Type #1. For example, the controller 113 may set the PWM duty based on the solid line in FIG. 8A and the brightness setting on the apparatus 10. At an operation S134, the controller 113 perform: obtaining a frame rate of the display device 11, and setting PWM frequency at the frame rate. After completing the operation S134, the processing may proceed to the operation S131.

At an operation S135, the controller 113 determines whether the contents type is Type #3 (Reading material) or not. If the contents type is Type #3, the processing proceeds to an operation S136. On the other hand, if the contents type is not Type #3, the processing proceeds to an operation S137.

At an operation S136, the controller 113 perform: setting the PWM duty at a third value corresponding to Type #3. For example, the controller 113 may set the PWM duty based on the dashed line in FIG. 8A and the brightness setting on the apparatus 10. In this case, the PWM duty is set to the maximum duty (e.g. 100%) regardless of the brightness setting. After completing the operation S136, the processing may proceed to the operation S131.

At an operation S137, the controller 113 perform: setting the PWM duty at a second value corresponding to Type #2 (Static-image). For example, the controller 113 may set the PWM duty based on the dash-dot line in FIG. 8A and the brightness setting on the apparatus 10. After completing the operation S137, the processing may proceed to the operation S131.

Figure 14:
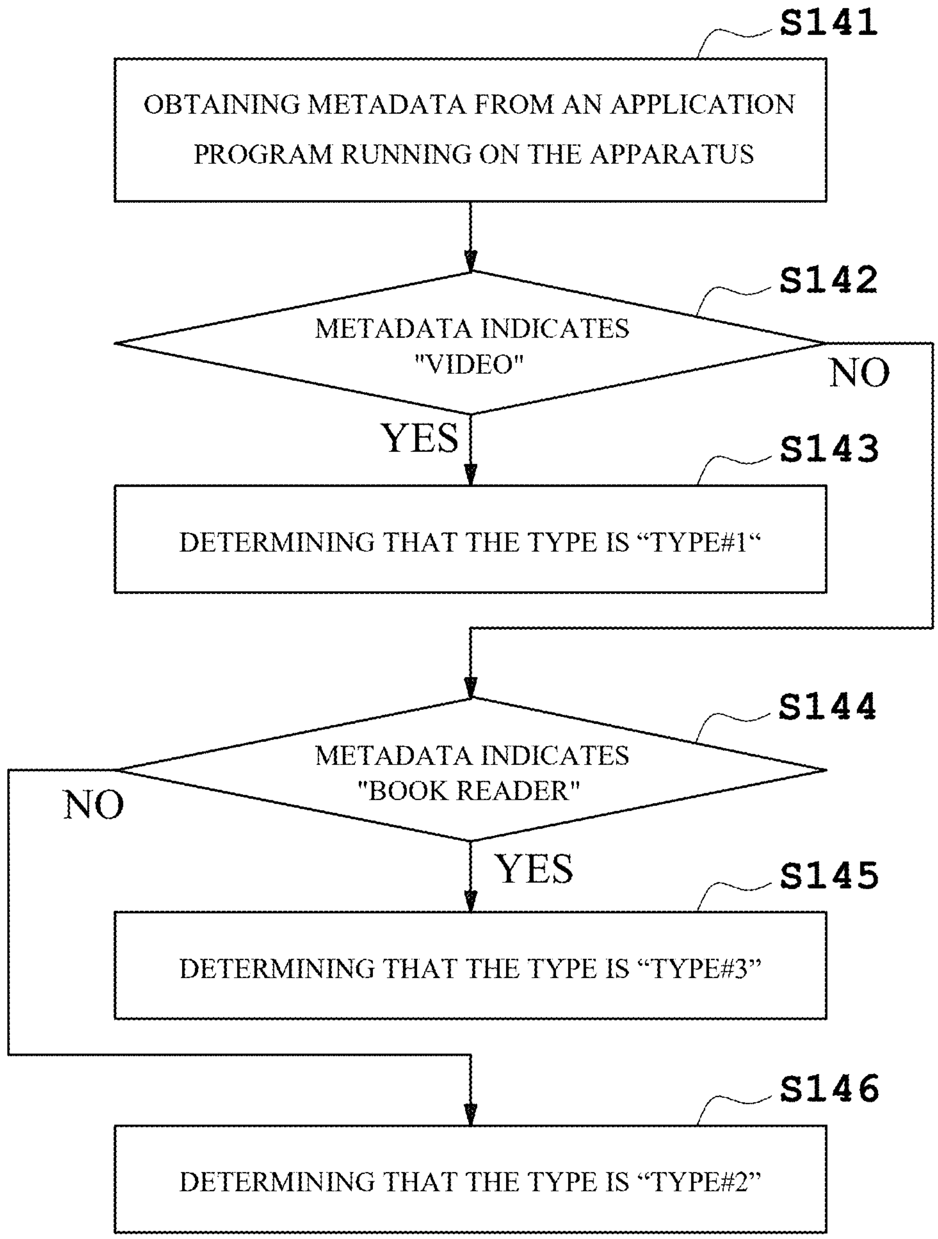
FIG. 14 shows a flowchart for describing a first method to determine the contents type, according to the embodiment of the present disclosure.

(First method for determining the contents type) Following describes a first method to determine the contents type (see S101 in FIG. 10 and S131 in FIG. 13), with reference to FIG. 14. FIG. 14 shows a flowchart for describing a first method to determine the contents type, according to the embodiment of the present disclosure.

At an operation S141, the controller 113 perform: obtaining metadata from an application program running on the apparatus 10. The metadata includes information about a type of contents playable on the application program.

At an operation S142, the controller 113 determines whether the metadata indicates “Video” or not. For example, the controller 113 determines the metadata indicates “Video” if the application program is a movie player, a video player, a multimedia player that can play a movie and/or a video, a web browser on which a plug-in program runs thereon for playing the video, or the like. If the metadata indicates “Video”, processing proceeds to an operation S143. On the other hand, if the metadata does not indicate “Video”, the processing proceeds to an operation S144. At an operation S143, the controller 113 perform: determining that the contents type is Type #1 (Video).

At an operation S144, the controller the controller 113 determines whether the metadata indicates “Reader” or not. For example, the controller 113 determines the metadata indicates “Reader” if the application program is a comic reader, a novel reader, a journal reader, a newspaper reader, or a reader usable for reading multiple kinds of reading material such as a comic, a novel, a journal or a newspaper. If the metadata indicates “Reader”, processing proceeds to an operation S145. On the other hand, if the metadata does not indicate “Reader”, the processing proceeds to an operation S146.

At an operation S145, the controller 113 perform: determining that the contents type is Type #3 (Reading material). At an operation S146, the controller 113 perform: determining that the contents type is Type #2 (Static-image).

Figure 15A:
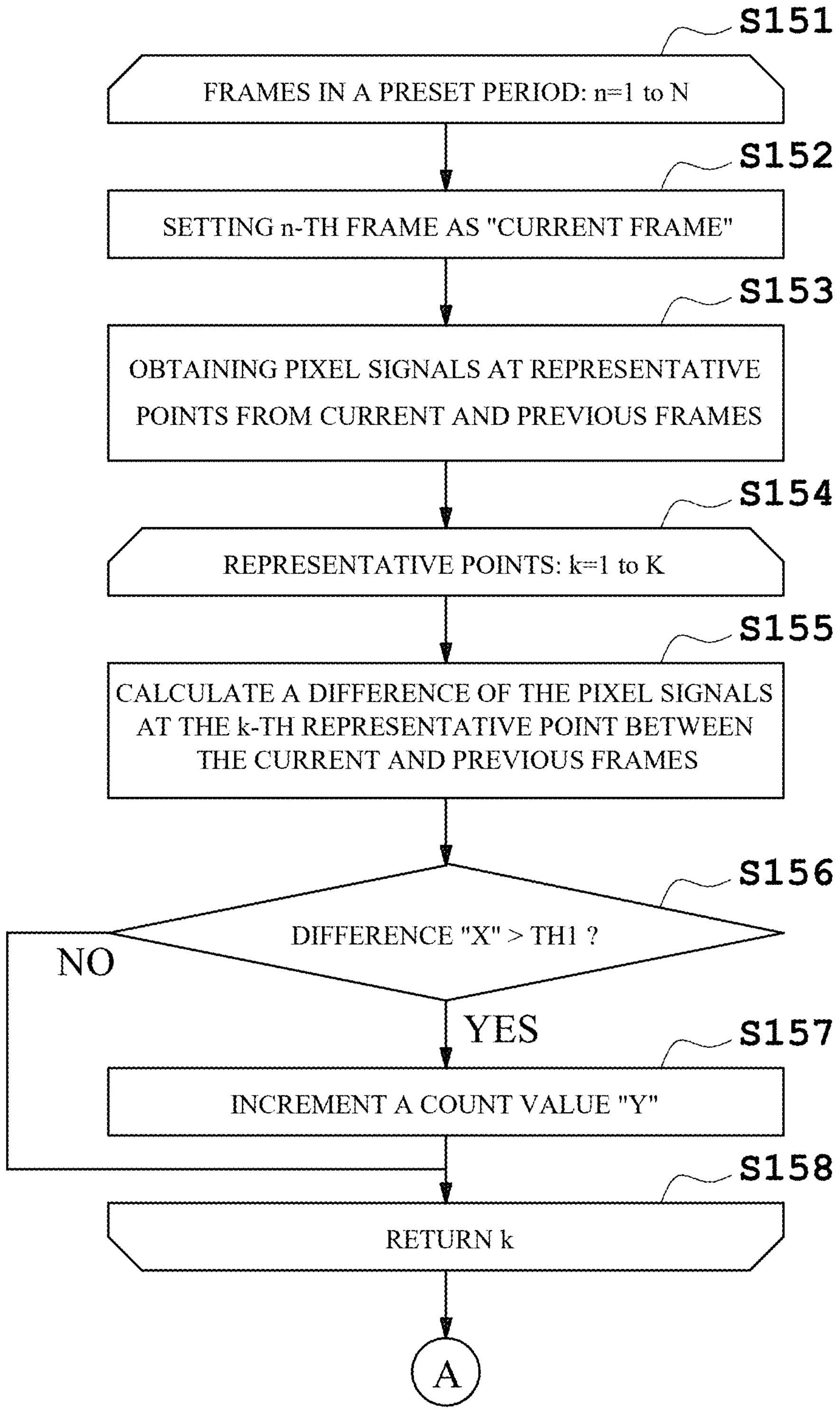
FIGS. 15A and 15B show a flowchart for describing a second method to determine the contents type, according to the embodiment of the present disclosure.
Figure 15B:
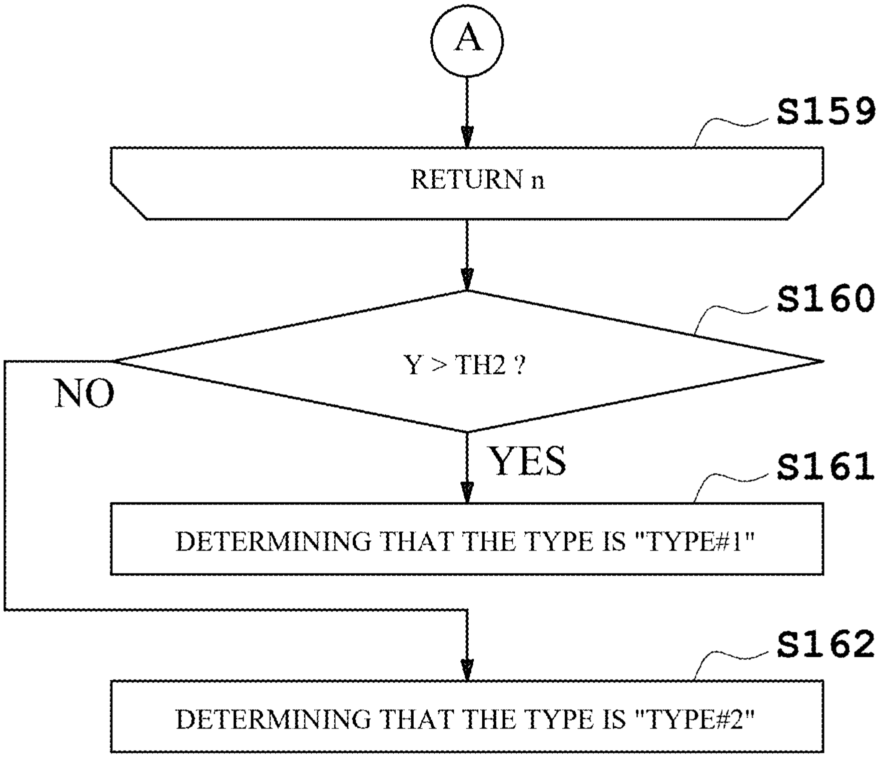

(Second method for determining the contents type) Following describes a second method to determine the contents type (see S101 in FIG. 10 and S131 in FIG. 13), with reference to FIGS. 15A and 15B. FIGS. 15A and 15B show a flowchart for describing a second method to determine the contents type, according to the embodiment of the present disclosure.

In FIGS. 15A and 15B, processes between steps S151 and S159 are repeated while changing an index n from 1 to N. The index n represents a n-th frame among frames corresponding to a preset period in target contents on display. N is a predetermined number of frames that defines a size of the preset period.

In addition, processes between operations S154 and S158 are repeated while changing an index k from 1 to K. The index k represents a k-th representative point among representative points preset on a screen on which the target contents is displayed. K is a total number of the representative points.

At the operation S151, the controller 113 sets the index n to a value according to the number of the repetitions. At an operation S152, the controller 113 performs: setting n-th frame as a current frame.

At an operation S153, the controller 113 performs: obtaining pixel signals at the representative points from the current frame and a previous frame just before the current frame. For each representative point, the controller 113 may obtain a pixel signal corresponding to a pixel just on the point, or pixel signals corresponding to a block that comprises a pixel just on the point and pixels around the point.

At the operation S154, the controller 113 sets the index k to a value according to the number of the repetitions. At an operation S155, the controller 113 calculates a difference of the pixel signals at the k-th representative point between the current and previous frames. For example, the difference may be provided by the following equation:

$$X=\mathrm{Abs}[P1-P2],$$

where X is the difference, P1 is the pixel signal of the k-th representative point in the previous frame, P2 is the pixel signal of the k-th representative point in the current frame, and Abs[ . . . ] indicates an absolute value calculation function.

At an operation S156, the controller 113 determines whether the difference X is larger than a first predetermined threshold TH1. If X>TH1, processing proceeds to an operation S157. On the other hand, if X≤TH1, the processing proceeds to the operation S158.

At the operation S157, the controller 113 increments a count value Y by +1, and proceeds the processing to the operation S158. At the operation S158, the processing proceeds to the operation S159 if k=K, and the processing returns to the operation S154 if the index k<K. At the operation S159, the processing proceeds to the operation S160 if n=N, and the processing returns to the operation S151 if n<N.

At the operation S160, the controller 113 determines whether the count value Y is larger than a second predetermined threshold TH2. If Y>TH2, the processing proceeds to an operation S161. On the other hand, if Y≤TH2, the processing proceeds to an operation S162. At the operation S161, the controller 113 perform: determining that the contents type is Type #1. At the operation S162, the controller 113 perform: determining that the contents type is Type #2.

Using the first and/or second methods above, the controller 113 may determine the contents type. However, these methods are merely examples and any other method may be used for determining the contents type. Further, the flowcharts shown in FIGS. 10, 13-14 and 15A-15B are merely examples, and are not intended to limit a scope of the embodiments described herein.

The foregoing disclosure merely discloses exemplary embodiments, and is not intended to limit the protection scope of the present application. It will be appreciated by those skilled in the art that the foregoing embodiments and all or some of other embodiments and modifications which may be derived based on the scope of claims of the present application will of course fall within the scope of the present application.

What is claimed is:

1. A method for controlling a display device in a pulse width modulation (PWM) driving mode, comprising:

obtaining, by a controller, a type of display contents displayed on the display device; and controlling, by the controller, a duty of PWM signals for driving the display device according to the type of the display contents, wherein the duty of the PWM signals is set to a first value if the type of the display contents is a video, and the duty of the PWM signals is set to a second value larger than the first value based on a brightness setting if the type of the display contents is a static-image, wherein the duty of the PWM signals is set to a third value if a brightness level is set to a first range and the type of the display contents is the video, and the duty of the PWM signals is set to a fourth value larger than the third value if the brightness level is set to a second range higher than the first range and the type of the display contents is the static-image.

2. The method according to claim 1, wherein the first value is configured to increase from a minimum duty to a maximum duty as a brightness level of the display device increases from a first brightness level to a maximum brightness level.

3. The method according to claim 1, wherein the second value is configured to increase from a minimum duty to a maximum duty as a brightness level of the display device increases from a minimum brightness level to a second brightness level.

4. The method according to claim 1, wherein when the type of the display contents changes from the video to the static-image, the duty of the PWM signals is controlled to increase gradually from the first value to the second value, and when the type of the display contents changes from the static-image to the video, the duty of the PWM signals is controlled to decrease gradually from the second value to the first value.

5. The method according to claim 1, wherein the duty of the PWM signals is set to a fifth value corresponding to a length of a single frame regardless of the brightness setting if the type of the display contents is a type relevant to reading material.

6. The method according to claim 5, wherein when the type of the display contents changes from the video or the static-image to the type, the duty of the PWM signals is controlled to increase gradually from the first or second value to the fifth value, and when the type of the display contents changes from the type to the video or the static-image, the duty of the PWM signals is controlled to decrease gradually from the fifth value to the first or second value.

7. The method according to claim 1, further comprising: obtaining, by the controller, metadata usable for determining the type of the display contents, and determining the type of the display contents based on the obtained metadata.

8. The method according to claim 1, further comprising: estimating, by the controller, the type of the display contents based on differences between a current frame and at least one frame before the current frame of the display contents.

9. The method according to claim 1, further comprising: controlling, by the controller, a pulse frequency of the PWM signals to be equal to a frame rate of the display contents if the type of the display contents is the video.

10. A display device comprising:

a display panel, a driver for driving the display panel by using pulse width modulation (PWM) signals, and a controller for controlling the driver configured to perform:

obtaining a type of display contents which are displayed on the display device; and controlling a duty of the PWM signals for driving the display device according to the type of the display contents, wherein the duty of the PWM signals is set to a first value if the type of the display contents is a video, and the duty of the PWM signals is set to a second value larger than the first value based on a brightness setting if the type of the display contents is a static-image, wherein the duty of the PWM signals is set to a third value if a brightness level is set to a first range and the type of the display contents is the video, and the duty of the PWM signals is set to a fourth value larger than the third value if the brightness level is set to a second range higher than the first range and the type of the display contents is the static-image.

11. The display device according to claim 10, wherein the first value is configured to increase from a minimum duty to a maximum duty as a brightness level of the display device increases from a first brightness level to a maximum brightness level.

12. The display device according to claim 10, wherein the second value is configured to increase from a minimum duty to a maximum duty as a brightness level of the display device increases from a minimum brightness level to a second brightness level.

13. The display device according to claim 10, wherein when the type of the display contents changes from the video to the static-image, the controller controls the driver to cause the duty of the PWM signals to increase gradually from the first value to the second value, and when the type of the display contents changes from the static-image to the video, the controller controls the driver to cause the duty of the PWM signals to decrease gradually from the second value to the first value.

14. The display device according to claim 10, wherein the duty of the PWM signals is set to a fifth value corresponding to a length of a single frame regardless of the brightness setting if the type of the display contents is a type relevant to reading material.

15. The display device according to claim 14, wherein when the type of the display contents changes from the video or the static-image to the type, the controller controls the driver to cause the duty of the PWM signals to increase gradually from the first or second value to the fifth value, and when the type of the display contents changes from the type to the video or the static-image, the controller controls to cause the duty of the PWM signals to decrease gradually from the fifth value to the first or second value.

16. The display device according to claim 10, wherein the controller is further configured to perform:

obtaining metadata usable for determining the type of the display contents, and determining the type of the display contents based on the obtained metadata.

17. The display device according to claim 10, wherein the controller is further configured to perform:

estimating the type of the display contents based on differences between a current frame and at least one frame before the current frame of the display contents.

18. The display device according to claim 10, wherein the controller is further configured to perform:

controlling a pulse frequency of the PWM signals to be equal to a frame rate of the display contents if the type of the display contents is the video.

19. An apparatus comprising:

a processor, and the display device according to claim 10, wherein the processor is configured to input data for displaying the display contents to the display device.

20. A non-transitory computer-readable storage medium having instructions stored therein, which when executed by a processor, cause the processor to perform operations, the operations comprising:

obtaining, by a controller, a type of display contents displayed on a display device; and controlling, by the controller, a duty of PWM signals for driving the display device according to the type of the display contents, wherein the duty of the PWM signals is set to a first value if the type of the display contents is a video, and the duty of the PWM signals is set to a second value larger than the first value based on a brightness setting if the type of the display contents is a static-image, wherein the duty of the PWM signals is set to a third value if a brightness level is set to a first range and the type of the display contents is the video, and the duty of the PWM signals is set to a fourth value larger than the third value if the brightness level is set to a second range higher than the first range and the type of the display contents is the static-image.

* * * * *